United States Patent [19]
van Goor et al.

[11] Patent Number: 5,818,864
[45] Date of Patent: Oct. 6, 1998

[54] METHOD AND DEVICE FOR GENERATING A LASER BEAM

[75] Inventors: Frederik Albert van Goor, Enschede; Hubertus Johannes van Heel, Fleringen, both of Netherlands

[73] Assignee: Urenco Nederland B.V., Netherlands

[21] Appl. No.: 716,307

[22] PCT Filed: Feb. 1, 1996

[86] PCT No.: PCT/NL96/00050

§ 371 Date: Sep. 23, 1996

§ 102(e) Date: Sep. 23, 1996

[87] PCT Pub. No.: WO96/24181

PCT Pub. Date: Aug. 8, 1996

[30] Foreign Application Priority Data

Feb. 2, 1995 [NL] Netherlands .......................... 9500197

[51] Int. Cl.$^6$ ...................................................... H01S 3/097
[52] U.S. Cl. .................................. 372/82; 372/9; 372/25; 372/37; 372/38; 372/103
[58] Field of Search ................... 372/56, 37, 69, 372/38, 57, 86, 103, 60, 2, 25, 82

[56] References Cited

U.S. PATENT DOCUMENTS

| 3,783,403 | 1/1974 | Hook et al. ................................ 372/38 |
| 4,393,505 | 7/1983 | Fahlen ........................................ 372/57 |
| 4,679,203 | 7/1987 | Tayloe et al. .............................. 372/86 |
| 5,309,462 | 5/1994 | Taylor et al. .............................. 372/86 |
| 5,313,487 | 5/1994 | Fujikawa et al. .......................... 372/86 |
| 5,748,635 | 5/1988 | McLellan .................................. 372/86 |

*Primary Examiner*—Leon Scott, Jr.
*Attorney, Agent, or Firm*—Michaelson & Wallce; Peter L. Michaelson; John C. Pokotylo

[57] ABSTRACT

Described are a method for generating a laser beam and a laser device for practising the method. In a first step gas is ionised by means of X-rays. In a second step the electron density is increased by means of a pre-discharge. In a third step the main discharge takes place. Between the second and third steps, an electron redistribution occurs. According to the invention, the electron redistribution rate and/or the time delay between the pre-discharge and the main discharge are adjustable and controllable in relation to each other, for achieving a particular desired beam profile, such as a uniform profile. Because that delay is preferably set by varying one or more process parameters, an improtant advantage is achieved in that it is possible with one and the same laser device to modify the beam profile in a simple and flexible manner even during the operation of the laser device.

45 Claims, 8 Drawing Sheets

METHOD AND DEVICE FOR GENERATING A LASER BEAM

BACKGROUND OF THE INVENTION

This invention relates to a method for generating a laser beam, and a laser device for practicing the method.

More particularly, the invention relates to a pulsed, transversely excited gas discharge laser. An example of such a laser is an excimer laser, such as an XeCl laser.

Such a laser device generally has the following structure. A gas chamber is provided with two oppositely arranged electrodes, to which a voltage can be applied for generating an electric field in the gas chamber, the main direction of which is designated as y-direction. A plasma to be generated between those electrodes amplifies light by stimulated emission. A laser beam can be generated by means of a resonator consisting of mirrors which may also close off the gas chamber. At least one of these mirrors should be partly transparent to the laser light so that the laser beam can leave the gas chamber. The direction of egress of the laser beam is perpendicular to the y-direction and is designated as z-direction. The dimension of the laser beam in the y-direction is sometimes referred to as the height. The transverse dimension of the laser beam in the direction perpendicular to the y-direction, to be referred to as x-direction, is sometimes referred to as the width. An example of such a laser device is described in the publication "A New Mode to Excite a Gas-Discharge XeCl Laser" by J. C. M. Timmermans, F. A. van Goor and W. J. Witteman in Applied Physics B, vol. 57 (1993), pp. 441–445. With such a device, the generation of the light-inducing plasma proceeds substantially in three steps. In a first step, the gas is ionized by means of radiation, typically X-rays. In a second step, the electron density is increased through a pre-discharge (breakdown) induced by a relatively short and high voltage pulse. In a third step, the main discharge takes place, whereby a relatively large current flows through the plasma for a relatively long time.

For certain applications of the laser beam produced, it is desired that the laser beam has a profile as uniform as possible in a largest possible area of its cross section. This is to say that the intensities Int(x,y) at different points in the beam are equal to each other to the highest possible extent and so are dependent to the least possible extent on the distances x and y of those points with respect to the main axis of the laser beam, measured perpendicularly to that main axis; and that the beam is defined as sharply as possible at its edge. An example of an application where a uniform laser beam profile is desired, is the machining of a surface through a shadow mask, for instance in IC technology. It is then desired that an equal exposure strength occurs in all points of the surface to be machined, in order that an equal light exposure time results in an equal machining result (such as for instance the burn-off depth), in particular when the beam is used to machine several products simultaneously via a plurality of juxtaposed identical masks.

In general, the laser beam profile in the y-direction satisfies the above-mentioned uniformity desire to a sufficient extent. This is due to the sharp boundary provided by the electrodes. By contrast, in the x-direction there is in conventional lasers a gradual decrease in intensity from the beam centre (x=0) to the edge; such a conventional profile can be designated as a bell-shaped profile.

In the art, proposals have previously been made to adapt the laser device in such a manner that the laser beam profile has an improved uniformity in the x-direction. These proposals are based on two mutually different principles.

A first principle is a mechanical principle, and involves the use of specially designed electrodes with a suitable shape (profiling). It has been found, however, that electrode shapes that could yield a reasonable uniformity of the laser beam profile give rise to instability of the gas discharge. According to this principle, therefore, at best a compromise can be achieved between good uniformity on the one hand and stable gas discharge on the other.

A further disadvantage of this mechanical principle is that it is relatively complicated and expensive.

Furthermore, a disadvantage of this first principle is that it is not applicable in an existing laser device without interventions in that laser device, namely, the replacement of the electrodes.

A second principle is an optical principle and is concerned with the improvement of the laser beam proper, generated by the laser device itself, by the use of optical means arranged at the output of that laser device. An example of this principle is described in the publication "Improvement of the first Kilowatt XeCl laser for different specific applications" by B. Godard, P. Murer, M. Stehle, J. Bonnet and D. Pigache in SPIE vol. 2206, pp. 25–29, and concerns their contribution to the conference on "High-Power Gas and Solid State Lasers" held in Vienna, Austria, from 5 to 8 Apr. 1994. Actually, this principle cannot be regarded as a way of generating a laser beam which intrinsically has a good uniformity, but only as a way of treating (improving) a laser beam which has a poor uniformity.

Although, this optical principle can be applied in an existing laser device without interventions in that laser device, the use of the optical correction means is disadvantageously accompanied by losses in beam strength. Further, this optical principle also has the disadvantage that it is relatively complicated and expensive.

According to both of the above principles, a particular laser beam profile is achieved in a given design of the laser device and/or of the optical correction means. Since that design is a fixed datum, it is not possible during operation of the laser device to modify the beam profile and/or to adjust it to changed operating conditions.

SUMMARY OF THE INVENTION

The object of the invention is to provide a laser beam with a desired laser beam profile via a third principle which is fundamentally different from the above principles and which does not suffer from the disadvantages mentioned.

The invention is based on the insight that after the pre-discharge, there is disposed between the laser electrodes a plasma with a rather sharp peak in the electron density, and that with the passage of time the electron distribution widens and becomes less concentrated, while the beam profile is determined to a considerable extent by the profile of the electron density at the instant of the main current. Accordingly, on the basis of this insight, in a method and device according to the present invention, a suitable combination is chosen of, on the one hand, the moment of initiation of the main current and, on the other, the time-dependent change in form of the electron density profile.

In a first variant, the invention provides an adjustable and controllable delay between the pre-discharge and the main current. In a second variant, the invention provides an adjustable and controllable rate at which the electron density profile changes over time. The two variants mentioned can also be combined.

Due to the fact that the settings mentioned are preferably effected by varying one or more process parameters, an important advantage gained is that it is possible with one and the same laser device to modify the beam profile in a simple and flexible manner, even during the operation of the laser device.

BRIEF DESCRIPTION OF THE DRAWINGS

These and other aspects, features and advantages of the present invention will be clarified by the following description of a preferred embodiment of a laser device according to the invention, with reference to the drawings, wherein.

DETAILED DESCRIPTION

Figure 1:
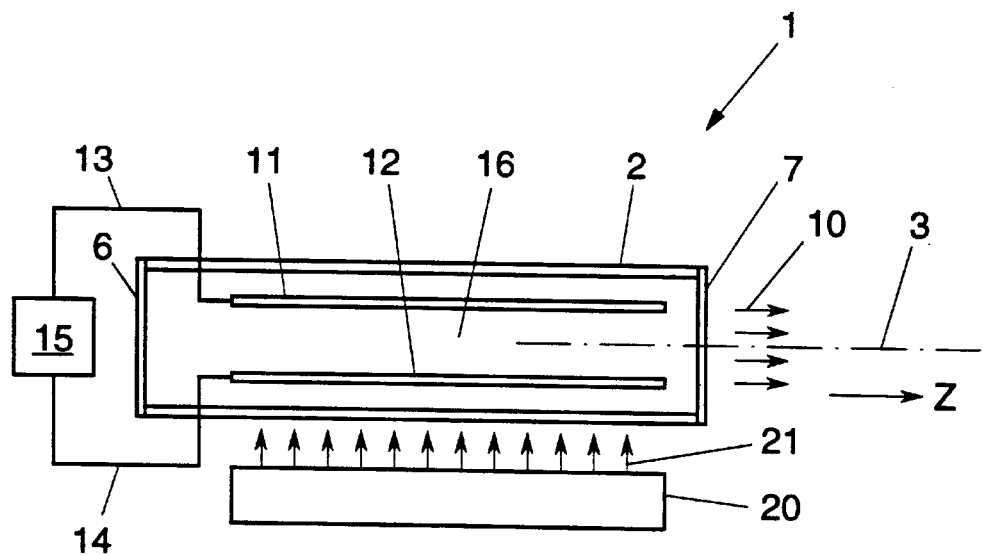
FIG. 1 diagrammatically shows a side elevation of a laser device according to the invention.
Figure 2:
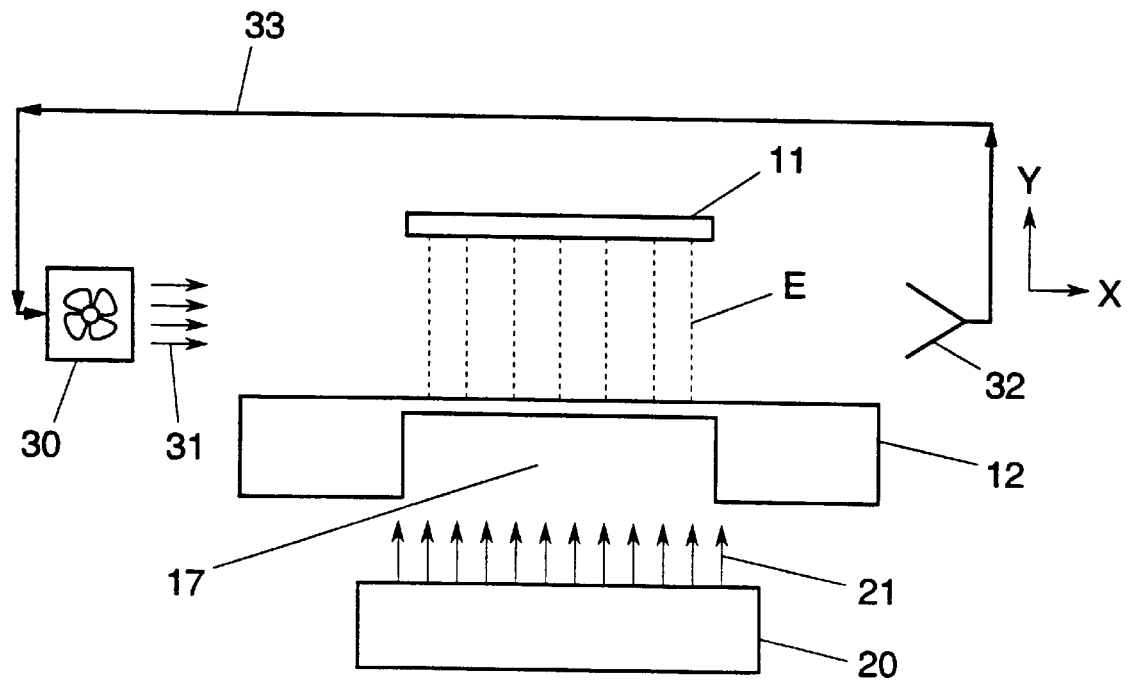
FIG. 2 diagrammatically shows a cross section of that laser device.

In FIGS. 1 and 2 a laser device is generally denoted by the reference numeral 1. The laser device 1 comprises a generally tubular gas chamber 2 and an optical axis 3, which defines the z-axis of a rectangular coordinate system. Disposed perpendicularly to the optical axis 3, at the ends of the gas chamber 2, are first and second mirrors 6 and 7. The first mirror 6 is non-transparent, while the second mirror 7 is partly transparent and defines an exit for a laser beam 10 from the gas chamber 2.

In the gas chamber 2, parallel to the optical axis 3, and on opposite sides thereof, laser electrodes 11, 12 are disposed, which are connected via lines 13, 14 to an electric energy source 15 arranged outside the gas chamber 2. A voltage applied between the laser electrodes 11, 12 will generate an electric field E which is substantially mirror-symmetrical and is perpendicular to the optical axis 3. The plane of symmetry of the electric field E defines the YZ plane in the rectangular coordinate system referred to. The space between the laser electrodes 11, 12 will be designated as discharge space 16.

Normally, one of those electrodes 12 constitutes a wall portion of the gas chamber 2. Arranged under that electrode 12 is a source 20 for ionizing radiation 21, normally X-rays or UV radiation. The radiation 21 from the source 20 can reach the discharge space 16 via a window 17 in one electrode 12.

For a more detailed description of an example of such a laser device, reference is made to the above-mentioned publication "A New Mode to Excite a Gas-Discharge XeCl Laser" by J. C. M. Timmermans, F. A. van Goor and W. J. Witteman in Applied Physics B, vol. 57 (1993), pp. 441–445.

The operation of the laser device 1 is known per se, and therefore will only be summarised briefly here. The gas chamber 2 is filled with a suitable gas or gas mixture at a suitable pressure. By means of the source 20 a pulse of ionizing radiation 21 is fed to the gas mixture, so that in the discharge space 16 a part of the gas present there will be ionized. As a result, typically an electron density of about $10^7$ cm$^{-3}$ will be achieved.

Then, by means of the source 15, there is applied to the laser electrodes 11, 12 a first voltage pulse with a peak value sufficient to effect a breakdown, as a result of which electron multiplication occurs in the plasma. As a result, the electron density will typically increase to about $10^{15}$ cm$^{-3}$.

Thereafter the source 15 delivers a second voltage pulse, also referred to as main pulse, for inducing a gas discharge. By the energy transferred to the plasma, gas atoms and/or gas molecules will be ionized or excited. Then a process of chemical reactions will take place, leading to the formation of excited excimer molecules. The excited state is also the laser upper level. Eventually, these molecules will lose their energy as a result of stimulated emission, which causes an increase of the amount of light quants in the optical resonator formed by the mirrors 6 and 7. The light generated finally leaves the gas chamber via the second mirror 7 as a laser beam 10 directed along the optical axis 3.

The gas in the gas chamber 2 is freshened through a gas flow 31 directed along the x-axis, generated, for instance, by a fan 30. The discharged gas can be collected in a line 32 and, optionally after cleaning, be returned via a return line 33 to the inlet of the fan 30.

After quenching of the main current, the above-described process can be repeated. In practice, repetition frequencies of about 1 kHz have been realized.

Figure 3:
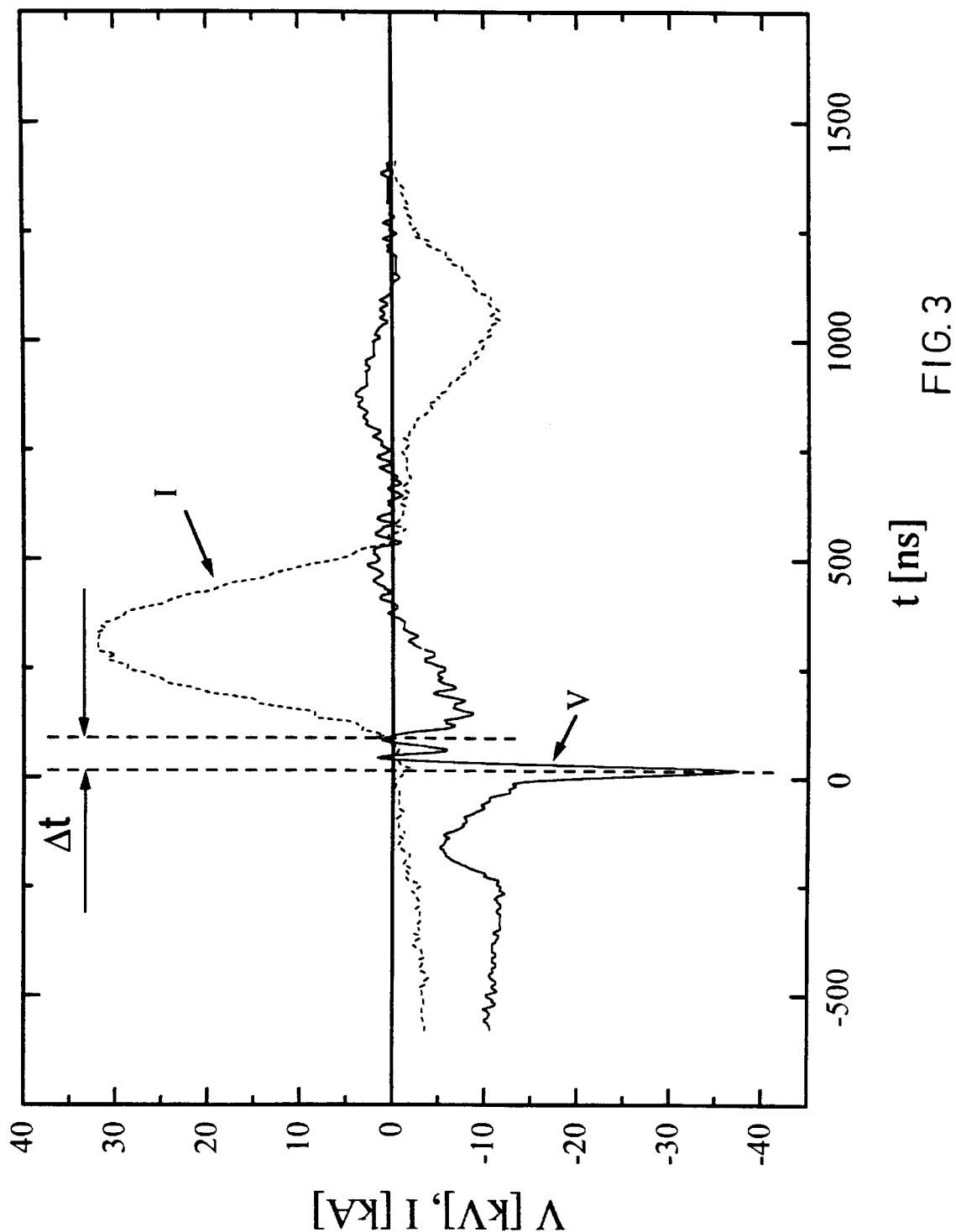
FIG. 3 shows an illustrative example of the course of the voltage across and the current through the transversely excited gas discharge in an XeCl laser device according to the invention.

FIG. 3 shows an illustrative example of the course of the voltage V across the laser electrodes 11, 12 and the current I through the gas discharge as a function of time t. The zero point of the time axis is chosen to be the instant when the breakdown mentioned occurs. It clearly appears from this figure that in the illustrated example the main current, whose maximum occurs at about 300 ns, is delayed with respect to that breakdown by a time delay $\Delta t$ of approximately 100 ns.

The occurrence of such a delay is known per se, as appears, for instance, from FIG. 4 of the above-mentioned publication in Applied Physics B, vol. 57 (1993), pp. 441–445. Heretofore, however, those skilled in the art have considered that delay a disadvantage, as evidenced in particular by the text on p. 140, lines 10–13 of the publication "Magnetic-spiker electrical circuits for gas discharge lasers" by R. S. Taylor, K. E. Leopold and M. von Dadelszen in SPIE vol. 2206, pp. 130–143, which publication concerns their contribution to the above-mentioned conference on "High-Power Gas and Solid State Lasers" held in Vienna, Austria, from 5 to 8 Apr. 1994.

The present invention is based on the insight that it is possible to put said time delay $\Delta t$ to use, and that, in a first realization mode of the concept of the invention, it is even possible to vary the time delay $\Delta t$ with relatively simple means and thereby to manipulate the width profile of the laser beam 10 in a useful manner, without adversely affecting the laser action of the laser device 1.

According to the current insight of the inventors, a possible explanation for the influence of a variation in the time delay $\Delta t$ on the width profile of the laser beam 10 is as follows. At the instant of breakdown, a plasma arises with an electron density distribution which is symmetrical relative to the YZ plane and is rather sharp with a rather high maximum. At the same time, however, halogen compounds in excited vibration states have been formed. With the passage of time, the electrons formed can be captured by those halogen compounds, whereby dissociation occurs. If the concentration of the molecules is greater, for instance by an order of magnitude, than the electron density, there will also occur a spatial redistribution of the electron density because of the fact that the initial spatial distribution of the halogen compounds in excited vibration states is approximately equal to that of the electrons. Hereinafter, the rate at which that spatial redistribution of the electron density proceeds, will be designated as electron redistribution rate.

By now choosing a suitable value for the time delay $\Delta t$ in such a manner that the main current occurs at a suitable spatial distribution profile of the electron density, a laser beam with a suitable beam profile can be generated.

Conversely, by choosing a suitable value for the electron redistribution rate, it can be effected that even at a fixed value of the time delay $\Delta t$ a suitable spatial distribution profile of the electron density is present at the moment the main current arises, so that again a laser beam with a suitable beam profile can be generated.

Within the scope of the concept of the invention, it is also possible to choose and set suitable values for both parameters, i.e., both for the time delay $\Delta y$ and for the electron redistribution rate.

Now follows a discussion of ways in which the setting of the time delay can be realized.

Figure 4A:
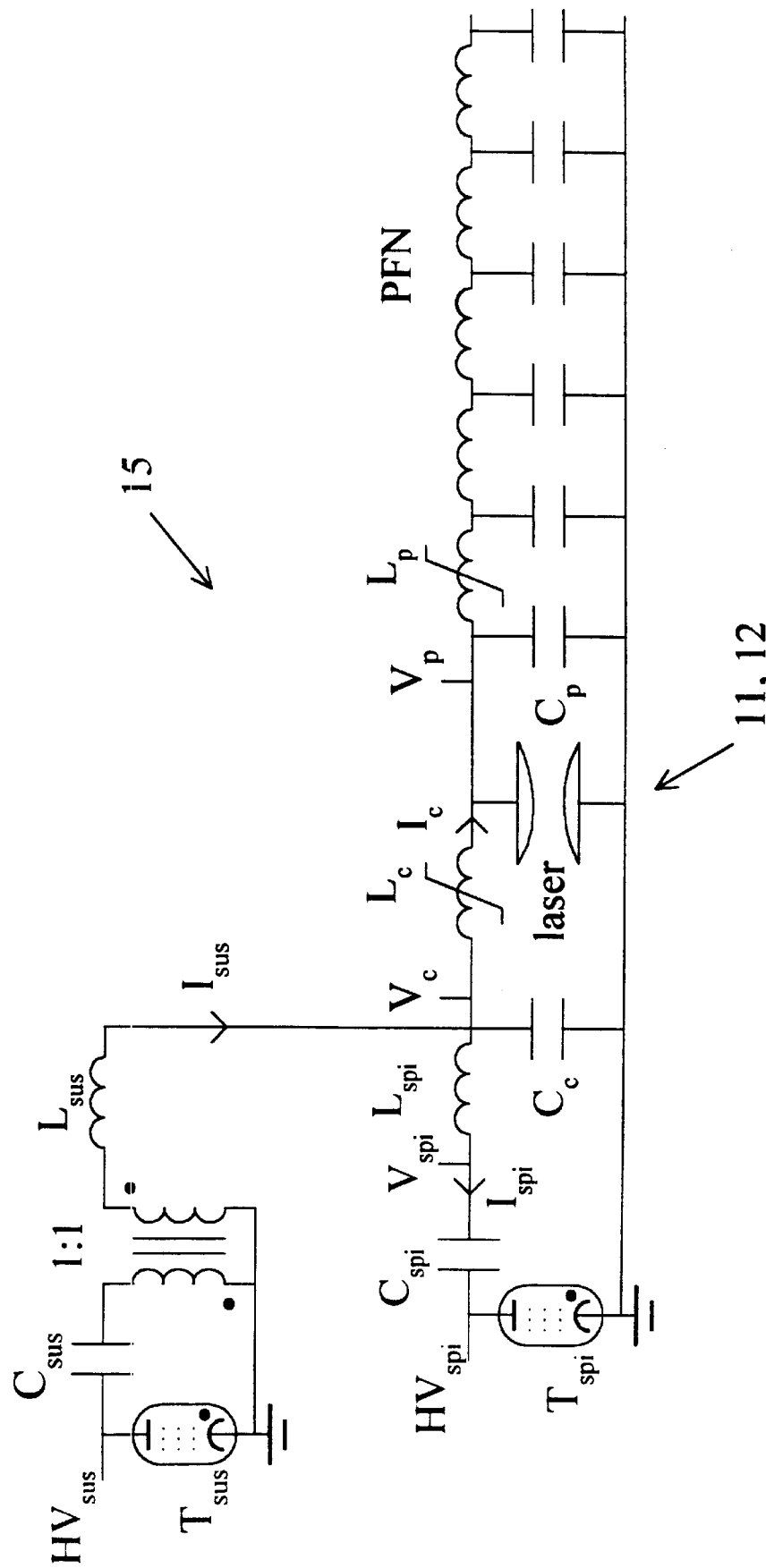
FIG. 4A shows a circuit diagram of an example of an excitation circuit for the XeCl laser according to the invention.
Figure 4B:
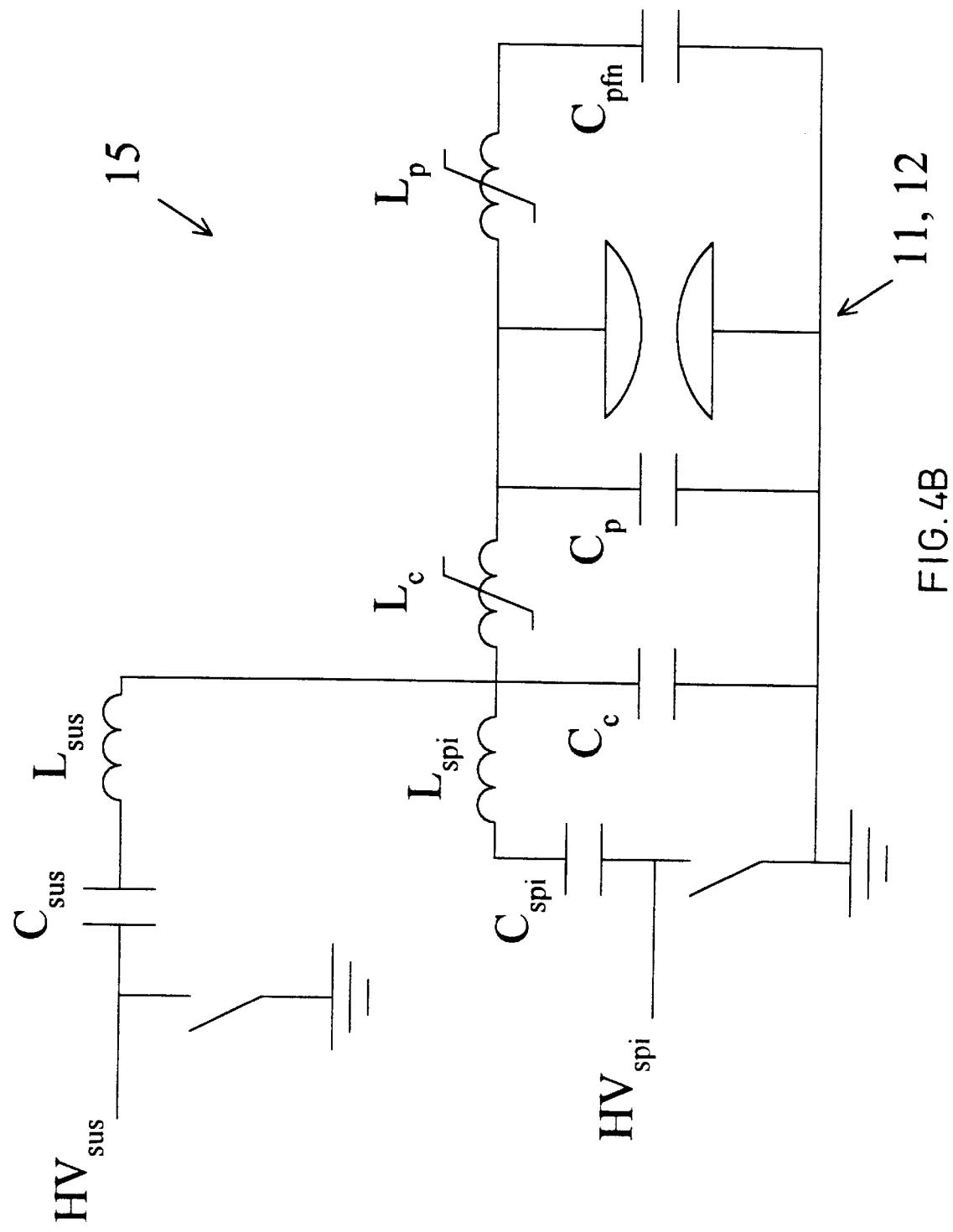
FIG. 4B shows a simplified version of the circuit diagram of FIG. 4.

FIG. 4A shows a schematic diagram of an example of a voltage source 15 capable of delivering two successive pulses at its output, i.e. at the laser electrodes 11, 12, in order to induce two successive discharges in the laser. This embodiment is discussed at length in the above-mentioned publication in Applied Physics B, vol. 57 (1993), pp. 441–445. FIG. 4B shows a simplified diagram of that excitation circuit, with omission of a few inessential details. The principle of operation, which is described in more detail in the publication mentioned, will now be briefly summarized.

From a source for primary voltage $HV_{sus}$, by closing a first switch $T_{sus}$, a main capacitor system $C_{PFN}$ is charged to a charging voltage $V_{PFN}$, with a charging current flowing via a first magnetically saturable inductor $L_C$ and a second saturable inductor $L_P$. Also, a peaking capacitor $C_P$ is charged to a voltage $V_P$.

After a certain time, a second switch $T_{spi}$ is closed, whereby, through a resonant charge transfer mechanism, the peaking capacitor $C_P$ is charged to a high voltage which induces the pre-discharge (breakdown). Thereafter the main discharge is induced from the main capacitor system $C_{PFN}$, with a time delay $\Delta t$ occurring between the breakdown and the main discharge in that the second saturable inductor $L_P$ must be brought to saturation first.

The time necessary for this is dependent inter alia on the amount of magnetically saturable material in this inductor, and meets Faraday's law, expressed in formulaic form as $\int V dt = A \cdot \Delta B$, where V is the voltage across the second saturable inductor $L_P$,
A is the magnetic surface, and
$\Delta B$ is the change of the magnetic induction.

According to a first embodiment of this variant of the present invention, the amount of magnetically saturable material in the second saturable inductor $L_P$ is selected for achieving a desired time delay $\Delta t$ selected in relation to the electron redistribution rate for achieving a desired width profile of the laser intensity.

Alternatively, it is, in principle, possible to adjust the values of the capacitances and inductions in the excitation circuit, but this is not preferred since these values have been selected for optimization of the gas discharge and modification of these values is typically accompanied by a deterioration of the quality of the gas discharge.

In this embodiment, therefore, setting a desired time delay $\Delta t$ means making modifications in the current source 15, with the laser device 1 itself remaining unmodified. Although it is possible in this way to achieve the desired result, that is, a predetermined time delay, without intervention in the laser device 1 itself, so that the measure referred to can be applied in existing laser devices in order to provide a desired beam profile in those laser devices, the result achieved is only a rigid whole with a fixed time delay, since for the purpose of changing the time delay, components of the excitation circuit have to be replaced, which is a complicated and time-consuming operation.

In a preferred embodiment according to the present invention, the time delay $\Delta t$ referred to is settable and controllable in a simple manner by varying the charging voltage $V_{PFN}$ of the main capacitor system $C_{PFN}$. This can be achieved in a simple manner by varying the primary voltage $HV_{sus}$. In the example of FIG. 3 the charging voltage $V_{PFN}$ was selected to be 12 kV.

EXAMPLE 1

In an experiment the relation between the charging voltage $V_{PFN}$ and the resultant time delay $\Delta t$ was measured. The laser device I used in this experiment is comparable to the device already described in the above-mentioned publication by J. C. M. Timmermans et al in Applied Physics B. The window 17 had a width of about 2 cm, the distance between the electrodes 11 and 12 was about 3 cm, and the gas discharge had a z-dimension of about 80 cm.

In the source 15, $C_C \approx 5$ nF, $C_P \approx 3$ nF, $C_{PFN} \approx 600$ nF. The gas chamber 2 was filled with a mixture of HCl, Xe and Ne with a total pressure of about 4.5 bara ($4.5 \cdot 10^5$ Pa), with the partial pressures of HCl and Xe being maintained equal to, respectively, 0.8 mbar (80 Pa) and 8.4 mbar (840 Pa).

Figure 5:
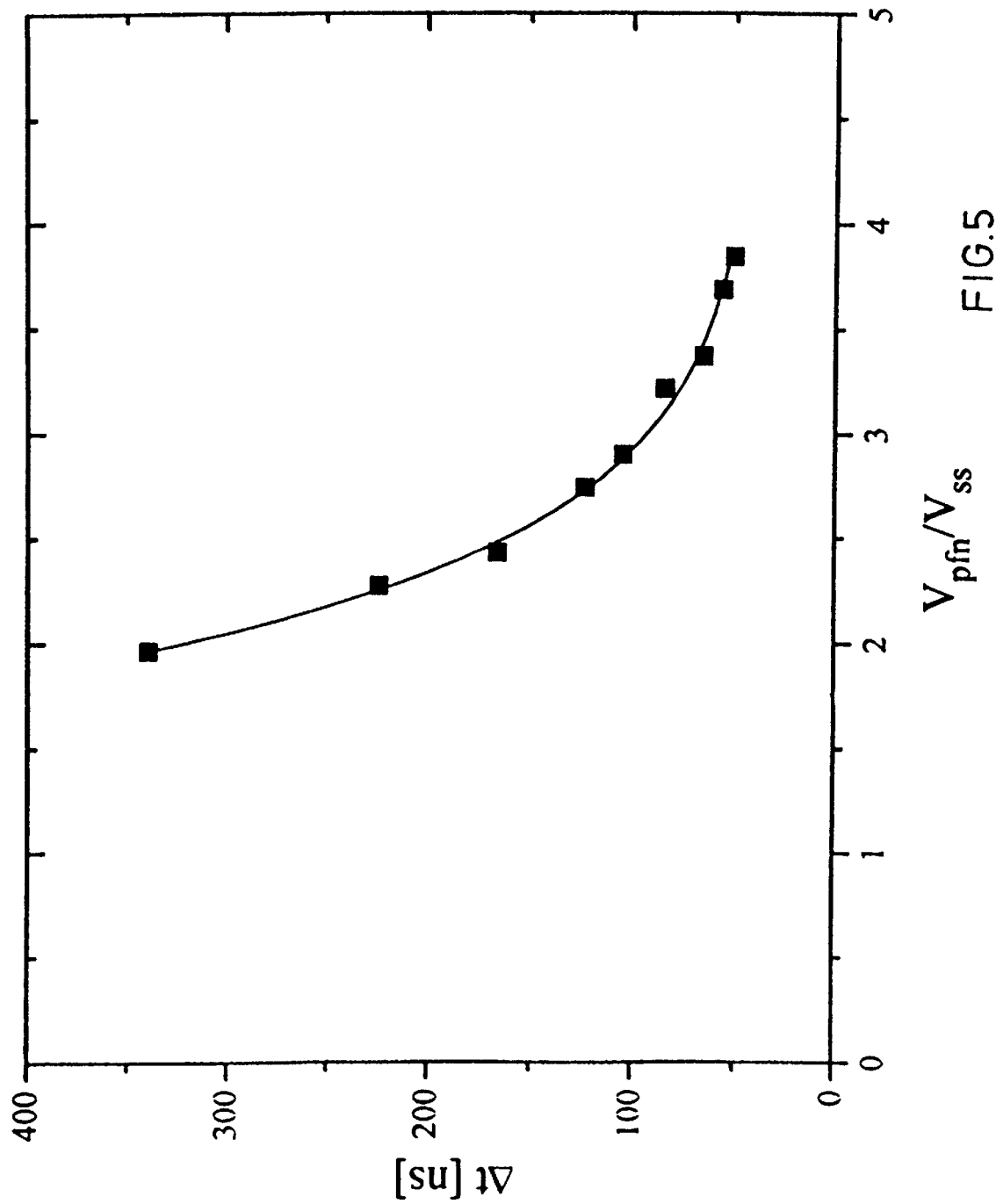
FIG. 5 is a graph showing the relation between charging voltage and time delay.

The measuring results are shown in the graph of FIG. 5. In FIG. 5 $V_{PFN}$ is expressed in multiples of $V_{SS}$, which in this case was about 3.9 kV. By $V_{SS}$ is meant herein: the voltage across the discharge during the so-called stationary condition which arises if upon the main discharge the loss of electrons resulting from dissociative attachment to HCl equals the production of electrons resulting from ionizations; the value of $V_{SS}$ is exclusively dependent on the composition and the pressure of the gas and on the electrode gap.

According to the current insight of the inventors, a possible explanation of the influence of the charging voltage $V_{PFN}$ of the main capacitor system $C_{PFN}$ on the delay time $\Delta t$ is as follows.

As already mentioned, the inductor $L_P$ can only start to conduct when it has been brought to saturation in the proper direction, which happens when the time integral of the voltage across the inductor becomes equal to or greater than the product of the magnetic surface and the maximum achieved magnetic induction change (see Faraday's law supra). Now, the higher the charging voltage $V_{PFN}$, the sooner that time integral reaches the limiting product mentioned, in other words, the shorter the delay time referred to.

EXAMPLE 2

Figure 6:
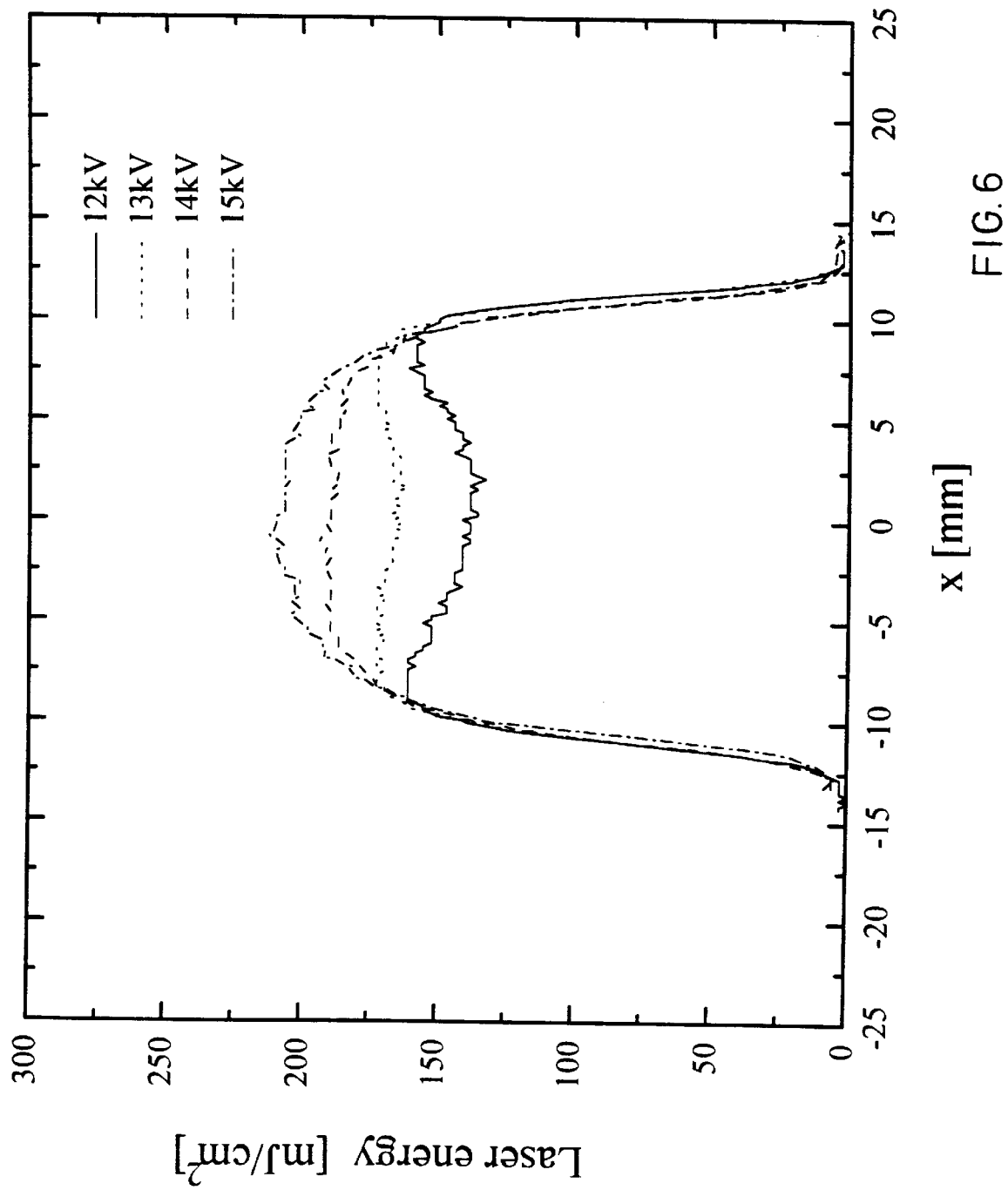
FIG. 6 is a graph showing the width profile of the laser beam at different values of the charging voltage.

In an experiment the relation was measured between the width profile of the laser energy and the charging voltage $V_{PFN}$ of the main capacitor, with all other parameters being maintained constant. The measuring results are represented in the graph of FIG. 6, where each curve corresponds with the course of the beam energy as a function of the position x at a height y=1.5 cm (midway between the electrodes 11, 12), with the zero point of the x-axis being chosen at the optical axis. The figure shows such a curve for four different $V_{PFN}$ values. In this experiment the HCl partial pressure was maintained constant at 80 Pa and the Xe partial pressure was maintained constant at 840 Pa. The carrier gas was formed by Ne at a pressure of 4.5 bar.

It clearly appears that it is possible to obtain a particular desired profile of the beam in the x-direction by choosing a suitable value of the charging voltage and delay time, respectively. At a charging voltage of 15 kV (delay about 50 ns) the profile achieved is a bell-shaped profile. Upon reduction of the charging voltage, a flattening of this profile arises, which corresponds with an improvement of the uniformity of the beam energy. In the example given, an optimum flattening seems to occur at about 13.5 kV, corresponding with a delay of about 75 ns. Such a profile is designated by the term "top hat profile". Further reduction (12 kV and less, delay about 100 ns) even gives rise to a profile with a local minimum in the centre and two off-axis maxima, which may be desirable in certain cases.

Since the charging voltage $V_{PFN}$ of the main capacitor system $C_{PFN}$ is a parameter which is freely adjustable within particular limits, without necessitating adaptations of the laser device and without adverse effect on the action of the laser device, the present invention provides the important advantage that even during operation of the laser device the width profile of the laser beam can be varied and set in a simple manner by a corresponding variation and setting of that charging voltage, for instance by variation and setting of the primary voltage $HV_{sus}$.

According to a second variant of the invention, it is also possible to obtain in a different way a suitable combination of the time delay $\Delta t$ and the electron redistribution rate, namely, by variation of the electron redistribution rate. This variant is based on the insight of the inventors that the electrons formed upon the breakdown are captured by the halogen compounds also formed in the process, and that the number of electrons captured per unit time is dependent on the concentration of those halogen compounds. According to the concept of the invention, it is possible in a relatively simple manner to vary and set the concentration of those halogen compounds, as will be described in the following.

Figure 7:
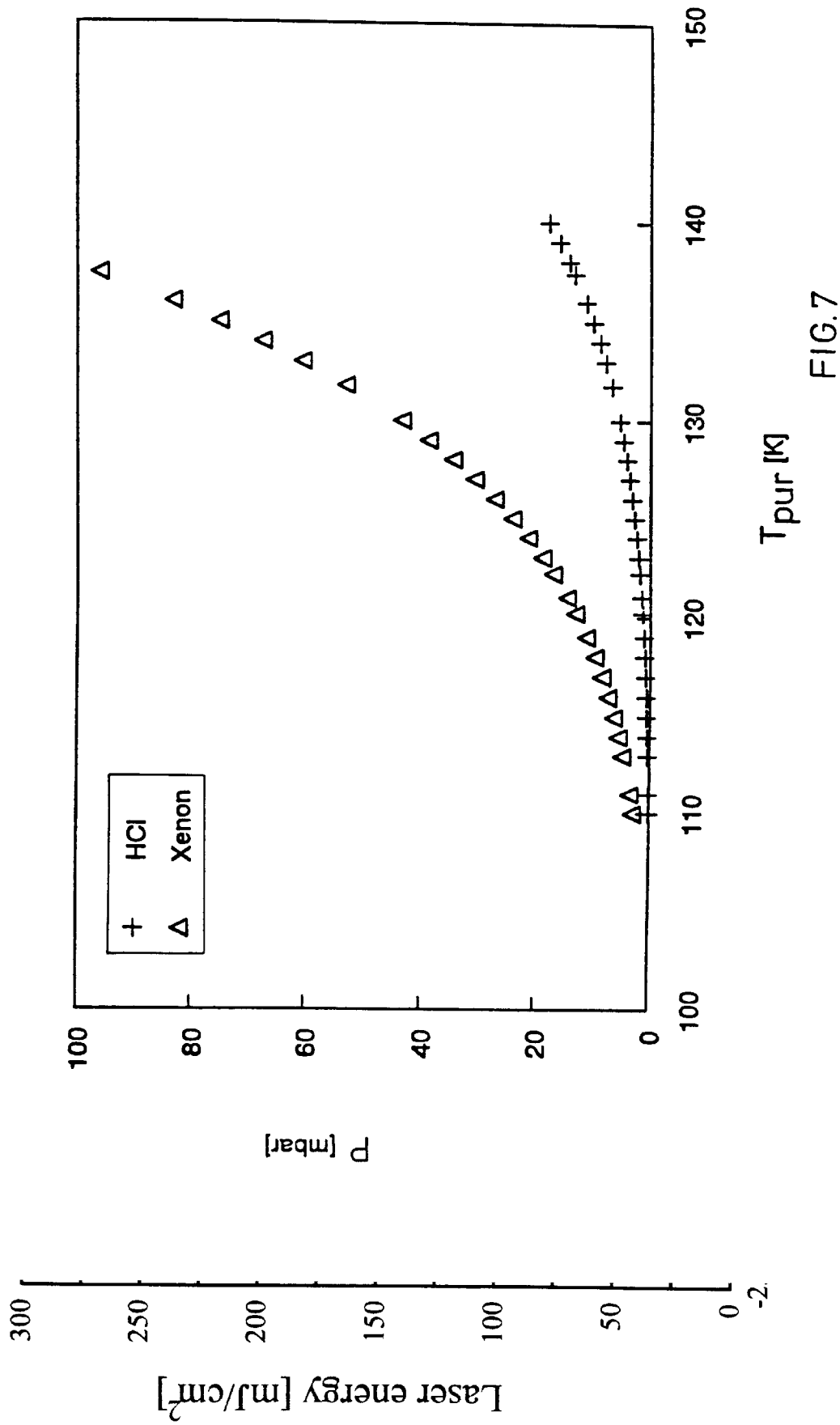
FIG. 7 is a graph showing the relation between the temperature and the vapour pressure of HCl and Xe.

As already mentioned, after "use" the gas is removed from the gas chamber 2, and preferably returned to the gas chamber 2 via a return line 33. To ensure that the gas then has and maintains a predetermined composition, the gas, before being fed to the gas chamber 2, is brought in heat exchanging contact with a condensation element, also referred to as 'purifier', which has as a consequence that the partial pressure of the halogen donor, HCl in the example discussed, corresponds with the vapor pressure thereof at the temperature of that condensation element. The relation between the temperature ($T_{pur}$) and the vapor pressure (P) of HCl and Xe in the range of 110 to 140K is shown in graphic form in FIG. 7. Since that temperature of that condensation element can be accurately set and maintained constant, the partial pressure of the halogen donor can also be accurately maintained constant.

Since the nature and construction of such a condensation element are not a subject of the present invention, and a skilled person requires no knowledge thereof for a proper understanding of the present invention, while moreover use can be made of condensation elements which are known per se, they will not be discussed further here.

EXAMPLE 3

Figure 8:
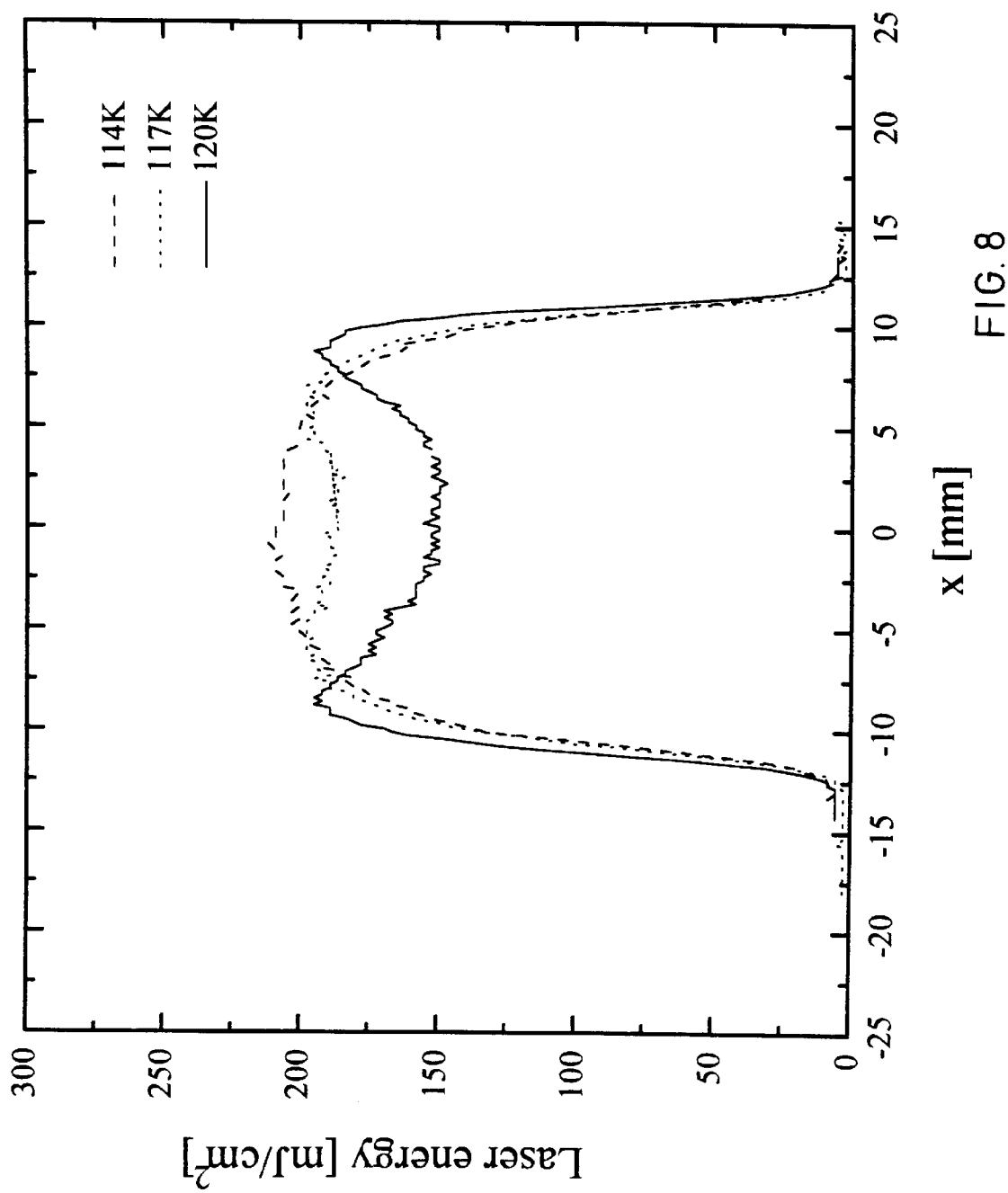
FIG. 8 is a graph showing the width profile of the laser beam at different values of the gas temperature.

In an experiment the relation was measured between the width profile of the laser energy and the temperature $T_{pur}$ of the condensation element, with all other parameters being maintained constant. The measuring results are represented in the graph of FIG. 8, where each curve corresponds with the course of the laser energy as a function of the position x at a height y=1.5 cm (midway between the electrodes 11, 12), with the zero point of the x-axis being chosen at the optical axis. The figure shows such a curve for three different $T_{pur}$ values. In this experiment the charging voltage $V_{PFN}$ was maintained constant at 15 kV, and the gas mixture was constituted practically completely of neon with a neon partial pressure of $P(Ne) \approx 4.5$ bar.

It clearly appears that it is possible to obtain a particular desired profile of the laser beam in the x-direction by choosing a suitable value of the temperature and vapour pressure, respectively. At a temperature of 114K (corresponding with $P(HCl) \approx 0.5$ mbar and $P(Xe) \approx 5.5$ mbar), the profile achieved is a bell-shaped profile. Upon increase of the temperature, a flattening of this profile arises, which corresponds with an improvement of the uniformity of the beam intensity. In the example shown, an optimum flattening seems to occur at about 116K. Further increase (120K, corresponding with $P(HCl) \approx 1.3$ mbar and $P(Xe) \approx 13.0$ mbar) gives rise to a profile with a local minimum in the centre and two pronounced off-axis maxima.

According to the invention, therefore, the temperature $T_{pur}$ of the condensation element is selected and set in such a manner that the halogen donor vapour pressure associated with the temperature set corresponds with the desired halogen donor partial pressure associated with a particular delay time $\Delta t$ to yield a desired laser beam profile.

The present invention can be of particularly great use for developing a laser device with a higher repetition frequency than has been possible so far. Thus a repetition frequency of 2 kHz will be attainable. This can be seen as follows.

As already mentioned, after each gas discharge the gas in the discharge space 16 is freshened by a gas flow 31 in the x-direction. One of the reasons for this is that as a result of the gas discharge undesired reaction products are formed in the discharge space 16. This means that a next discharge cannot be triggered until the discharge space 16 has been cleared to a sufficient extent or, in other words, not until the gas in the discharge space 16 has been displaced over a sufficiently great distance in the x-direction. "Sufficiently great" here means the distance is greater than the width of the gas discharge formed. It is largely dependent on the width of the pre-ionisation, which in turn is dependent on the width of the beam of ionising radiation 21, that is, the width of the window 17.

If a greater repetition frequency is desired, the gas in the discharge space 16 will have to be freshened faster. This could in principle be effected by increasing the rate of displacement of the gas, but above particular gas velocities a further increase meets with practical limits. An important problem here is, for instance, the occurrence of turbulences in the gas stream.

According to the invention, even at an equal gas velocity, the repetition frequency can still be considerably enlarged by reducing the width of the window 17, for instance to 0.5 cm, so that the pre-ionisation is narrowed. True, a consequence is that the profile of the laser beam 10 is changed, and more particularly a narrower window 17 will reduce the uniformity of the beam 10 in that the beam will acquire a rather high intensity at its centre and from there will rapidly become weaker towards the edges, but with the aid of the measures proposed by the invention such changes can be compensated and it is possible in particular to restore the uniformity of the beam profile.

Since it is thus possible, in accordance with the concept of the invention, to influence the width, quality and repetition frequency of the laser beam from outside, i.e. without interventions in the laser proper, a considerable broadening of the range of operation of the laser is achieved in accordance with the invention. Thus the invention makes an important contribution to the technical field of laser technology by increasing the usability of a laser.

It will be clear to one of ordinary skill in the art that it is possible to change or modify the embodiment of the device according to the invention as represented, without departing from the concept of the invention or the scope of protection. Thus it is for instance possible that the laser device is an excimer laser with a different gas mixture, or a transversely excited gas laser of a different type. By way of example, the KrF excimer laser can be mentioned here.

It is also possible to use a different buffer gas, for instance He.

Further, it is possible to automate the setting of a desired beam profile, viz. by first measuring the beam profile in a test phase with the aid of a computer which compares the measured profile with a priorly inputted profile (top hat), and which thereafter varies some parameters until the profile produced corresponds with the profile sought, to subsequently ensure during the operation of the device that those parameters are maintained at the value set.

We claim:

1. A method for generating a laser beam having a defined beam axis, the method comprising steps of:
   a) applying, at a first time, a first voltage pulse to an at least partly ionized gas for effecting an electron multiplication;
   b) applying, at a second time, a second voltage pulse to the at least partly ionized gas for effecting a gas discharge;
   c) setting a time difference ($\Delta t$) between the first time and the second time and setting an electron redistributed rate occurring between the first and second times such that a relatively flat profile of the laser beam in a direction perpendicular to the beam axis and perpendicular to an electric field generated by the first and second voltage pulses is achieved.

2. A method according to claim 1, wherein said time difference ($\Delta t$) is set in the range of 30–400 ns.

3. A method according to claim 2, wherein said laser beam is generated with a repetition frequency which is greater than 1 kHz, and wherein said steps of setting the time difference and electron redistribution rate are done in relation to a width of a pre-ionization of the gas.

4. A method according to claim 1, wherein said step of setting said time difference ($\Delta t$) is effected by using a pulse source arranged for delivering said first and second voltage pulses with adjustable time delay.

5. A method according to claim 4, wherein the step of applying the first voltage pulse includes a sub-step of generating the first voltage pulse by means of a first pulse forming network charged to a first predetermined voltage value, and wherein the step of applying the second voltage pulse includes a sub-step of generating the second voltage pulse by means of a second pulse forming network charged to a second predetermined voltage value, the method further comprising a step of:
   d) separating the first and second pulse forming networks from each other by means of a magnetically saturable inductor,
   wherein said step of setting said time difference ($\Delta t$) includes a sub-step of varying the second predetermined voltage value of the second pulse forming network.

6. A method according to claim 5, wherein said second predetermined voltage value of the second pulse forming network is chosen in the range of 7–18 kV.

7. A method according to claim 5, wherein said second predetermined voltage value of the second pulse forming network is chosen in the range of 12–15 kV.

8. A method according to claim 5, wherein said second predetermined voltage value of the second pulse forming network is chosen to be about 13.5 kV.

9. A method according to claim 4, wherein said second predetermined voltage value of the second pulse forming network is set by varying a primary voltage value of a supply source for the first and second pulse forming networks.

10. A method according to claim 4, wherein the step of applying the first voltage pulse includes a sub-step of generating the first voltage pulse by means of a first pulse forming network charged to a first predetermined voltage and the step of applying the second voltage pulse includes a sub-step of generating the second voltage pulse by means of a second pulse forming network charged to a second predetermined voltage, the method further comprising a step of:
   d) separating the first and second pulse forming networks from each other by means of a magnetically saturable inductor,
   wherein said step of setting said time difference ($\Delta t$) includes a sub-step of choosing a suitable amount of the magnetically saturable material in the magnetically saturable inductor.

11. A method according to claim 1, wherein said gas comprises a mixture of a first active component, a halogen donor, and a carrier gas, and wherein said step of setting said electron redistribution rate includes a sub-step of varying a partial pressure of at least the halogen donor.

12. A method according to claim 11, wherein the sub-step of varying a partial pressure of the halogen donor is performed such that the partial pressure is in the range of 0.1 to 20 mbar.

13. A method according to claim 11, wherein the sub-step of varying the partial pressure of the halogen donor includes steps of bringing the gas mixture in heat exchanging contact with a condensation element and setting a temperature of the condensation element such that a vapor pressure of the halogen donor at the temperature set corresponds with the partial pressure of the halogen donor.

14. A method according to claim 13, wherein the temperature of the condensation element is set in the range of 110–140K.

15. A method according to claim 13, wherein the temperature of the condensation element is set in the range of 110–125K.

16. A method according to claim 13, wherein the temperature of the condensation element is set in the range of about 116–117K.

17. A method according to claim 11, wherein the sub-step of varying a partial pressure of the halogen donor is performed such that the partial pressure is in the range of 0.5 to 1.3 mbar.

18. A method according to claim 11, wherein the sub-step of varying a partial pressure of the halogen donor is performed such that the partial pressure is about 0.8 mbar.

19. A method according to claim 1, wherein the time difference is set such that a uniform top hat laser beam profile is achieved.

20. A method according to claim 1, wherein said time difference ($\Delta t$) is set in the range of 50–100 ns.

21. A method according to claim 1, wherein said time difference ($\Delta t$) is set to about 75 ns.

22. A laser device for generating a laser beam having a defined beam axis, the laser device comprising:
   a) means for generating a first voltage pulse for effecting an electron multiplication;
   b) means for generating a second voltage pulse for effecting a gas discharge; and
   c) means for setting the time delay $\Delta t$ between the first voltage pulse and the second voltage pulse wherein the laser device has a repetition frequency considerably greater than 1 kHz and wherein the laser beam has a relatively flat profile in a direction perpendicular to its beam axis and perpendicular to an electric field generated by the first voltage pulse and a second electric field generated by a second voltage pulse.

23. A laser device according to claim 22, wherein the means for generating the first and second voltage pulses are a pulse source arranged for delivering the first and second voltage pulses with adjustable time delay.

24. A laser device according to claim 23, wherein the pulse source includes
   i) a first pulse forming network for generating the first voltage pulse,
   ii) a second pulse forming network for generating the second voltage pulse,
   iii) a magnetically saturable inductor for separating the first and second pulse forming networks, and
   iv) means for varying the voltage value of the second pulse forming network.

25. A laser device according to claim 24, further comprising
   d) a supply source for the first and second pulse forming networks; and
   e) means for varying a primary voltage of the supply source.

26. A laser device according to claim 22 further comprising:
   d) a source for ionizing radiation; and
   e) a radiation transparent window, through which the ionizing radiation may travel, wherein a width of the window is variable.

27. A laser device according to claim 22 further comprising:
   d) a source for ionizing radiation; and
   e) a radiation transparent window, through which the ionizing radiation may travel, wherein a width of the window is less than 2 cm.

28. A laser device according to claim 22 further comprising a source for ionizing radiation and a radiation transparent window wherein a width of the window is less than about 0.5 cm.

29. A laser device comprising:
   a) means for applying, at a first time, a first voltage pulse to an at least partly ionized gas for effecting an electron multiplication and for applying, at a second time, a second voltage pulse for effecting a gas discharge; and
   b) means for setting electron redistribution rate between the first and second times such that an emitted laser beam has a relatively flat profile in a direction perpendicular to an axis of the laser beam and perpendicular to an electric field generated by the first and second voltage pulses.

30. A laser device according to claim 29, wherein said gas comprises a mixture of a first active component, a halogen donor, and a carrier gas, the laser device further comprising:
   c) elements for setting the partial pressure of at least the halogen donor.

31. A laser device according to claim 30, further comprising:
   d) a purifier; and
   e) means for setting a temperature of the purifier.

32. A laser device for generating a laser beam, the laser device comprising:
   a) means for applying, to an at least partly ionized gas, a first voltage pulse at a first time for effecting an electron multiplication; and
   b) means for thereafter applying a second voltage pulse at a second time for effecting a gas discharge, wherein a time difference ($\Delta t$) between the first time and the second time and an electron redistribution rate occurring between the first and second times is such that the laser beam has a top hat profile in a direction perpendicular to its beam axis and perpendicular to an electric field generated by the first and second voltage pulses.

33. A laser device according to claim 32, wherein said time difference ($\Delta t$) is in the range of 30–400 ns.

34. A laser device according to claim 32, wherein the means for applying and the means for thereafter applying include a pulse source arranged for delivering the first and second voltage pulses with a predetermined time delay between them.

35. A laser device according to claim 34, wherein the pulse source includes
   i) a first pulse forming network for generating the first voltage pulse,
   ii) a second pulse forming network for generating the second voltage pulse, and
   iii) a magnetically saturable inductor for separating the first and second pulse forming networks, wherein a value of the second voltage pulse forming network is in the range of 7–18 kV.

36. A laser device according to claim 34, wherein the pulse source includes a first pulse forming network for generating the first voltage pulse, a second pulse forming network for generating the second voltage pulse, and a magnetically saturable inductor for separating the first and second pulse forming networks, wherein a value of the second voltage pulse forming network is in the range of 12–15 kV.

37. A laser device according to claim 34, wherein the pulse source includes a first pulse forming network for generating the first voltage pulse, a second pulse forming network for generating the second voltage pulse, and a magnetically saturable inductor for separating the first and second pulse forming networks, wherein a value of the second voltage pulse forming network is about 13.5 kV.

38. A laser device according to claim 32, wherein said gas comprises a mixture of a first active component, a halogen donor, and a carrier gas, and wherein the partial pressure of the halogen donor is in the range of 0.1 to 20 mbar.

39. A laser device according to claim 38 further comprising:

c) a purifier, the temperature of which is in the range of 110–140K.

40. A laser device according to claim 38 further comprising a purifier, the temperature of which is in the range of 110–125K.

41. A laser device according to claim 38 further comprising a purifier, the temperature of which is in the range of about 116–117K.

42. A laser device according to claim 32, wherein the laser beam has a uniform top hat profile.

43. A laser device according to claim 32, wherein said time difference ($\Delta t$) is in the range of 50–100 ns.

44. A laser device according to claim 32, wherein said time difference ($\Delta t$) is about 75 ns.

45. A laser device according to claim 32, wherein said gas comprises a mixture of a first active component such as Xe, a halogen donor such as HCl, and a carrier gas such as Ne, and wherein the partial pressure of the halogen donor is about 0.8 mbar.

* * * * *